No. 738,885. PATENTED SEPT. 15, 1903.
W. P. COLDREN.
PROCESS OF MAKING LIPPED SEALING RINGS FOR CANNING JARS.
APPLICATION FILED JUNE 1, 1903.
NO MODEL. 2 SHEETS—SHEET 1.
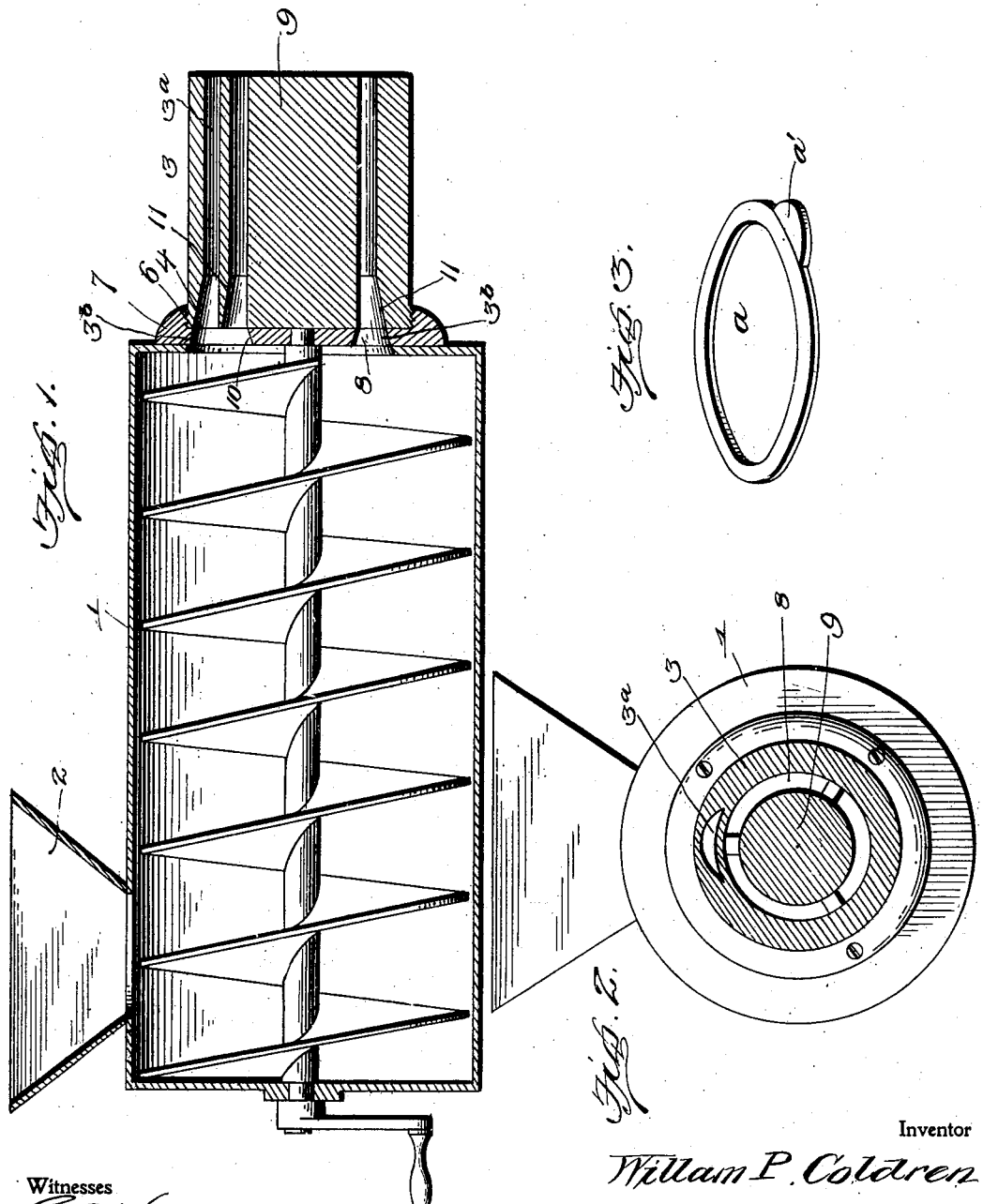
Witnesses
Inventor
William P. Coldren
By H. B. Willson
Attorney

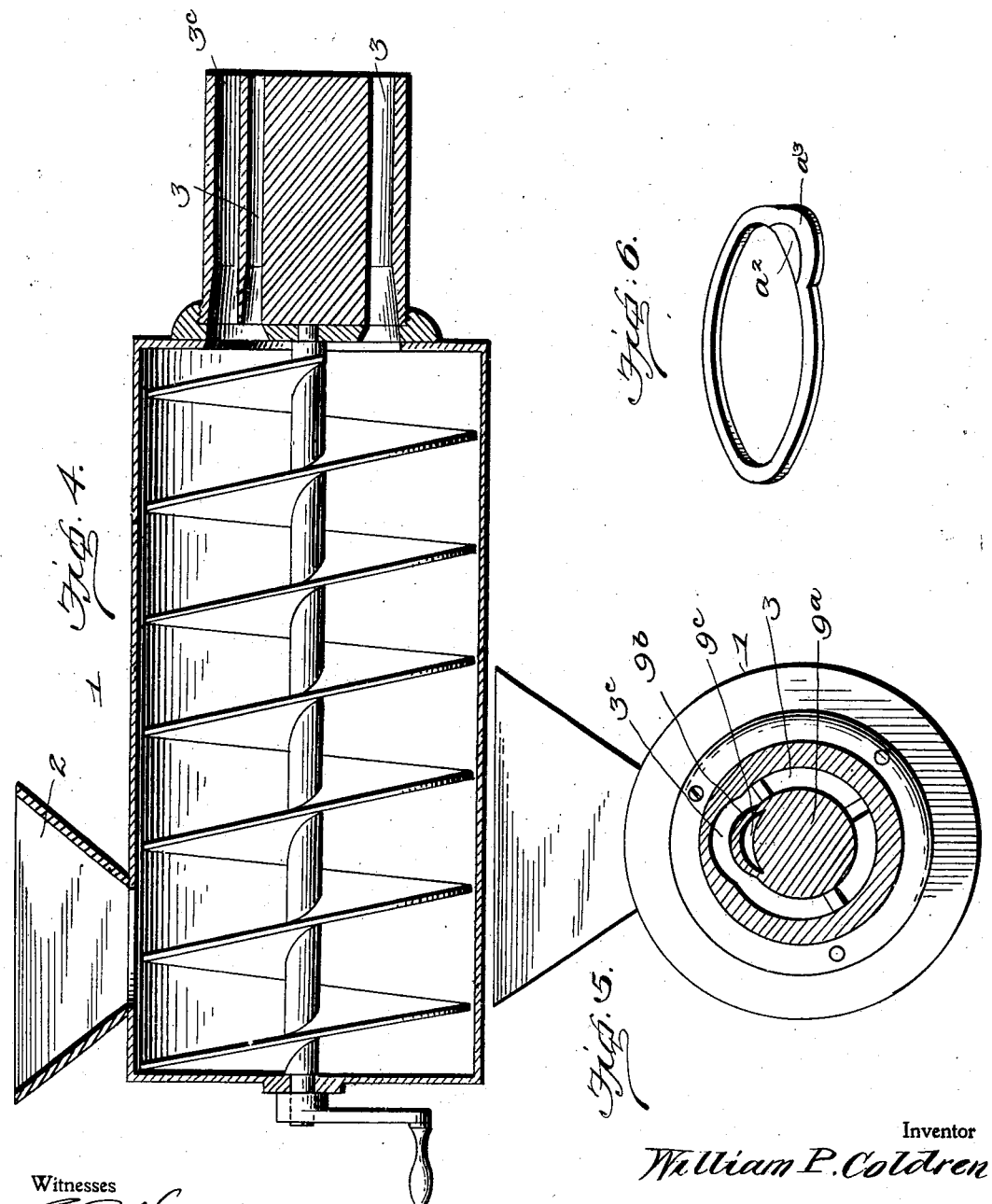

No. 738,885. Patented September 15, 1903.

UNITED STATES PATENT OFFICE.

WILLIAM P. COLDREN, OF LEBANON, PENNSYLVANIA.

PROCESS OF MAKING LIPPED SEALING-RINGS FOR CANNING-JARS.

SPECIFICATION forming part of Letters Patent No. 738,885, dated September 15, 1903.

Application filed June 1, 1903. Serial No. 159,665. (No model.)

*To all whom it may concern:*

Be it known that I, WILLIAM P. COLDREN, a citizen of the United States, residing at Lebanon, in the county of Lebanon and State of Pennsylvania, have invented certain new and useful Improvements in Processes of Making Lipped Sealing-Rings for Canning-Jars; and I do declare the following to be a full, clear, and exact description of the invention, such as will enable others skilled in the art to which it appertains to make and use the same.

My invention is an improved process for making lipped sealing-rings for canning-jars; and it consists of simultaneously and separately constructing a rubber tube and lip-piece, uniting the same together, and cutting the same transversely to form the sealing-rings, as hereinafter described, illustrated, and claimed.

In the accompanying drawings, Figure 1 is a longitudinal sectional view of an apparatus for carrying my improved process into effect. Fig. 2 is a transverse sectional view of the same. Fig. 3 is a detail perspective view of one of the sealing-rings made by my improved process. Fig. 4 is a longitudinal sectional view of a modified construction of the apparatus. Fig. 5 is a transverse sectional view of the same. Fig. 6 is a detail view showing a modified construction of the sealing-ring.

The sealing-rings made by my improved process are provided with laterally-projecting lips or ears by means of which they may be readily grasped and drawn outwardly at one point from between the neck of the jar and the cover thereof to break the vacuum in the jar and enable the cover to be readily unscrewed therefrom.

I will now describe my improved process in connection with an apparatus by means of which it may be carried into effect.

A vessel 1 of suitable size and shape and made of suitable material is adapted to hold a quantity of rubber in a molten fluid condition and is provided on its upper side at one end with a hopper 2, through which the melted rubber is supplied thereto. At the opposite end of the vessel is a former-spout 3, which is tubular and in the form of the apparatus shown in Figs. 1 and 2 is cylindrical in form. In this form of the apparatus said former-spout has in the wall forming its upper side a longitudinal former-passage $3^a$, which is crescent shape in cross-section, as shown in Fig. 2, and is somewhat spaced from the bore of the spout. The cross-sectional size and shape of this former-passage corresponds with the size and shape of the lips or ears which are to be formed on the sealing-rings. The inner end of the bore of the former-spout is flared outwardly, as at 4, where it communicates with the vessel 1. The inner end of the former spout or tube 3 is screwed in an annular groove 6 in the outer side of a collar 7, which collar is secured on the discharge end of a vessel 1 and is provided with a central opening 8, in which is centered and supported the inner end of a cylindrical former-mandrel 9, the inner end of which is tapered, as at 10, to widen the annual channel formed by the opening 8, and the outer side of the said opening is also flared, as at 11, to correspond with the flared inner end of the bore of the former-spout. Said collar is also provided with an inwardly-flared opening $3^b$, which registers with the inner end of the passage $3^a$.

It will be understood that as the molten rubber is forced from the vessel 1 through the former-spout, in which the mandrel is disposed and centered, the rubber as it hardens during its passage through the former-spout and around the mandrel will form a cylindrical tube and that by cutting said tube cross-sectionally sealing-rings $a$ of suitable thickness will be formed. It will also be understood that molten rubber forced at the same time through the passage $3^a$ will form a lip strip or piece, which is produced simultaneously with the tube and which by reason of its being above the tube will dispose itself on the upper side thereof as the tube and former-strip emerge from the apparatus. This tube and lip-strip become united while being vulcanized, so that when the rings are cut from the tubes the lip-strip is also cut, and hence each ring is provided with a lip $a'$, which is firmly united thereto at one side.

In the form of apparatus shown in Figs. 4 and 5 the bore 3 of the former-spout is provided in its upper side with a longitudinal former-groove $3^c$ of the size and shape cross-sectionally of the lips or ears which are to be formed on the sealing-ring. Hence it will be understood that the lip portion of the tube will be formed simultaneously therewith and integral therewith. The mandrel $9^a$ is provided on its upper side with a bead $9^b$, the surface of which is concentric with that of the groove $3^c$, and the said mandrel is also provided in the said beaded portion thereof with a longitudinal former-passage $9^c$, which is crescent shape cross-sectionally and which causes a strip $a^2$ to be formed simultaneously with the tube from which the rings are cut and on the inner side of the tube, which strip will fit in the grooved portion of the rubber tube and become united thereto when the same is vulcanized prior to the cutting of the rings therefrom. Hence the rings cut from the tube will be of the form shown in Fig. 6, with the lip portion integral therewith and a reinforce portion $a^3$ on the inner side of the lip.

Having thus described my invention, I claim—

1. The herein-described process of manufacturing sealing-rings consisting in forming a rubber tube with a longitudinal lip-piece on one side and cutting the same cross-sectionally into rings.

2. The herein-described process of forming lipped sealing-rings consisting in simultaneously forming a rubber tube and rubber lip-strip and uniting them together, and cutting said tube and strip cross-sectionally.

In testimony whereof I have hereunto set my hand in presence of two subscribing witnesses.

WILLIAM P. COLDREN.

Witnesses:
CHAS. M. COLDREN,
FRANK NAGLE.